United States Patent
Muthukrishnan et al.

(10) Patent No.: US 9,582,787 B2
(45) Date of Patent: Feb. 28, 2017

(54) RECOVERY OF DECLINED TRANSACTIONS

(71) Applicant: PAYPAL, INC., San Jose, CA (US)

(72) Inventors: Venkatraman Muthukrishnan, Chennai (IN); Desmond Kwokhon Chan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 21 days.

(21) Appl. No.: 14/191,361

(22) Filed: Feb. 26, 2014

(65) Prior Publication Data

US 2014/0316981 A1 Oct. 23, 2014

Related U.S. Application Data

(60) Provisional application No. 61/815,121, filed on Apr. 23, 2013.

(51) Int. Cl.
*G06Q 40/00* (2012.01)
*G06Q 20/02* (2012.01)
*G06Q 20/12* (2012.01)
*G06Q 20/40* (2012.01)

(52) U.S. Cl.
CPC ............. *G06Q 20/02* (2013.01); *G06Q 20/12* (2013.01); *G06Q 20/407* (2013.01)

(58) Field of Classification Search
USPC ........................................ 705/35, 39, 40, 38
See application file for complete search history.

(56) References Cited

U.S. PATENT DOCUMENTS

| | | | | |
|---|---|---|---|---|
| 7,243,082 B1 * | 7/2007 | Forlai | ............................ | 705/37 |
| 7,263,505 B1 * | 8/2007 | Forlai | ............................ | 705/37 |
| 7,797,231 B1 * | 9/2010 | Loeb et al. | ..................... | 705/38 |
| 8,020,763 B1 * | 9/2011 | Kowalchyk et al. | ......... | 235/380 |
| 8,600,873 B2 * | 12/2013 | Fisher | ............................ | 705/38 |
| 2004/0225609 A1 * | 11/2004 | Greene | ........................... | 705/40 |
| 2008/0120235 A1 * | 5/2008 | Chu | ................................. | 705/44 |
| 2009/0287565 A1 * | 11/2009 | Bishop et al. | ............. | 705/14.38 |
| 2009/0299841 A1 * | 12/2009 | Bishop et al. | ............. | 705/14.21 |
| 2010/0114733 A1 * | 5/2010 | Collas et al. | .................... | 705/26 |
| 2010/0211469 A1 * | 8/2010 | Salmon et al. | .................. | 705/16 |
| 2011/0167002 A1 * | 7/2011 | Balasubramanian et al. | .. | 705/44 |
| 2011/0180598 A1 * | 7/2011 | Morgan et al. | ................ | 235/380 |
| 2012/0005076 A1 * | 1/2012 | Dessert et al. | ................... | 705/39 |
| 2012/0036045 A1 * | 2/2012 | Lowe et al. | ................ | 705/26.44 |
| 2012/0054046 A1 * | 3/2012 | Albisu | ............................ | 705/16 |
| 2012/0089521 A1 * | 4/2012 | Abrevaya et al. | .............. | 705/75 |
| 2013/0036058 A1 * | 2/2013 | Kelly et al. | ...................... | 705/67 |
| 2013/0304637 A1 * | 11/2013 | McCabe et al. | ................ | 705/39 |
| 2014/0052586 A1 * | 2/2014 | Weber | ......................... | 705/26.82 |

\* cited by examiner

*Primary Examiner* — Lalita M Hamilton
(74) *Attorney, Agent, or Firm* — Haynes and Boone, LLP

(57) ABSTRACT

Systems and methods for facilitating a purchase are described. When a payment processor declines a transaction, an error code is sent to a merchant. The error code indicates to the merchant that the failed transaction is recoverable if the user chooses a new funding source or payment instrument. The merchant sends the user back to a payment service provider site where the user can either choose a new funding source or enter a new payment method.

20 Claims, 5 Drawing Sheets

RECOVERY OF DECLINED TRANSACTIONS

CROSS-REFERENCE TO RELATED APPLICATION

Pursuant to 35 U.S.C. §119(e), this application claims priority to the filing date of U.S. Provisional Patent Application No. 61/815,121, filed Apr. 23, 2013, which is incorporated by reference in its entirety.

BACKGROUND

Field of the Invention

The present invention generally relates to recovering declined payment transactions.

Related Art

When a user shops on a merchant's website, the user typically provides a credit card, debit card, bank account, or some other form of payment during checkout. If the user's credit card is declined, the user is usually not informed about the reason the card was declined, only that the transaction did not go through. In most situations, the user will attempt to use another payment method, but will have to repopulate the shopping cart with previously selected items, click on the checkout button, and then enter the new payment funding details. In other words, the user has to restart the entire transaction.

Such lack of capability of recovering purchase transactions with a different payment means disrupts a seamless purchase experience of the user and causes loss of sales that are otherwise recoverable because many users choose to give up. It is inconvenient and a hassle to have to start the purchase procedure from the very beginning. Thus, a need exists for improved methods that allow a user to select a new payment method for transactions that are declined.

Figure 1:
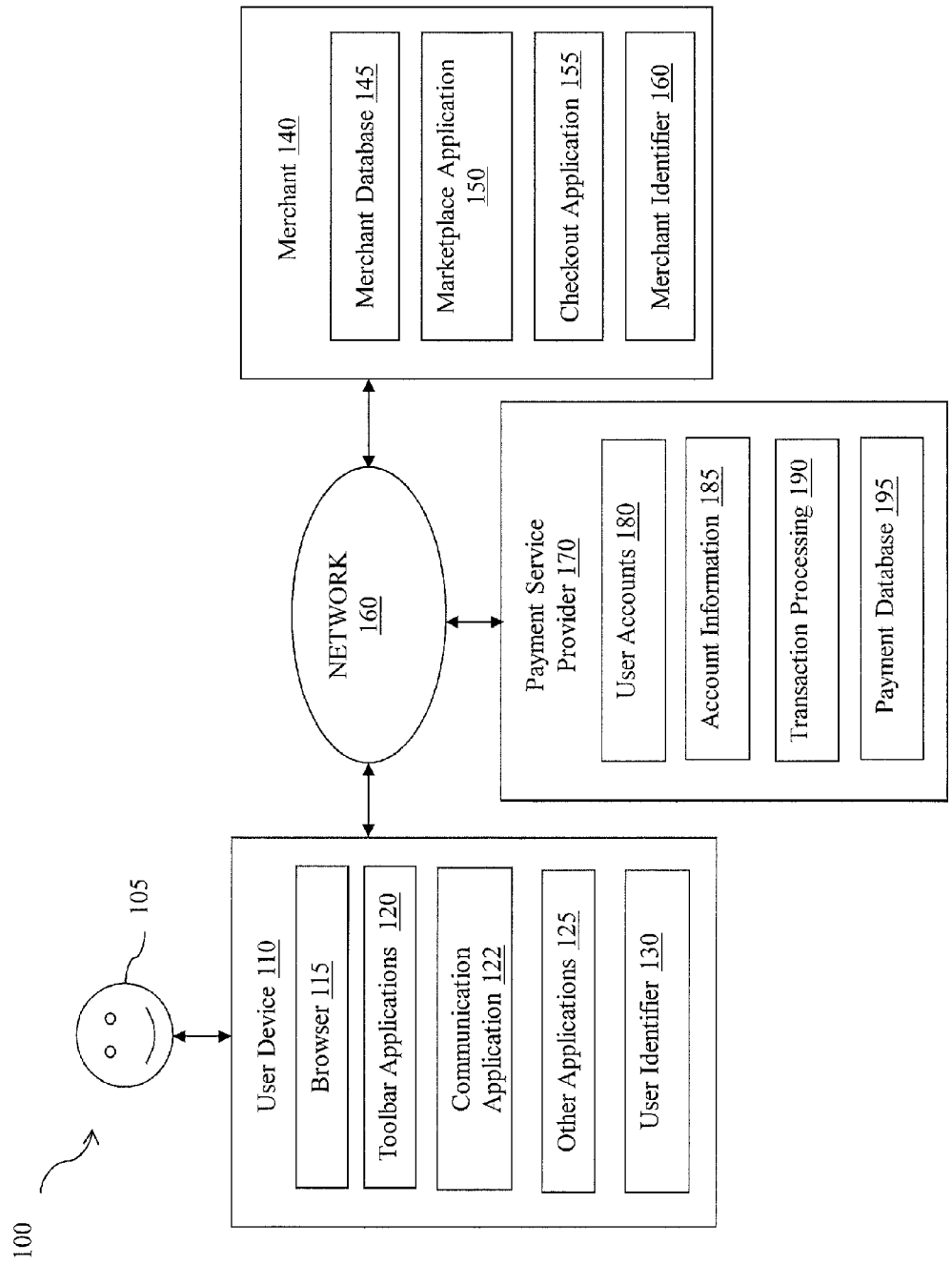
FIG. 1 is a block diagram illustrating a system for facilitating a purchase according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure is directed to techniques that allow a user to stay in the same purchase session and the same checkout flow, even when payment is declined. The systems and methods described herein can automatically redirect the user to a payment service provider site when a payment failure occurs so that the user can select another payment means or instrument and retry the purchase without starting the shopping and payment process over. In other words, the user does not need to select the items to purchase, add them to the cart, select a shipping address, and enter payment information all over again.

In various embodiments, a user may use the service of a payment service provider, such as PayPal®, Inc. of San Jose, Calif., for shopping and payment during checkout. Once selecting the link to the payment service provider, the user is directed to the payment service provider's website through a pop-up screen on the merchant site. Once logged in and/or authenticated, the user can designate or choose a payment instrument such as a credit card, debit card, bank account, or account with the payment service provider.

In one embodiment, the user selects, for example, a credit card for payment. When the user confirms use of the credit card, the merchant is notified and makes a payment request, via an application programming interface (API) of the payment service provider, to the entity that issued the credit card. When the payment is declined by the issuer, the payment service provider sends an error code, as part of the API response, to the merchant. The error code notifies the merchant that the failed transaction is recoverable if the user chooses a new funding source or payment instrument. The merchant redirects the user to the payment service provider site, the user is automatically logged in to the payment service provider site, and the user is brought back to the payment page.

FIG. 1 shows one embodiment of a block diagram of a network-based system 100 configured to handle processes, such as described herein, in accordance with an embodiment of the invention. System 100 includes a user device 110, a merchant server 140, and a payment service provider server 170 in communication over a network 160. Payment service provider server 170 may be maintained by a service or payment service provider, such as PayPal®, Inc. or eBay®, Inc. of San Jose, Calif. A user 105, such as a consumer, utilizes user device 110 to make a purchase transaction facilitated by payment service provider server 170, with one or more merchants.

User device 110, merchant server 140, and payment service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet or access a website of the payment service provider. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 may further include other applications 125 as may be desired in particular embodiments to provide desired features to user device 110. For example, other applications 125 may include security applications for implementing client-side security features, programmatic client applications for interfacing with appropriate application programming interfaces (APIs) over network 160, or other types of applications. Applications 125 may also include email, texting, voice and IM applications that allow user 105 to send and receive emails, calls, texts, and other notifications through network 160. User device 110 includes one or more user identifiers 130 which may be implemented, for example, as operating system registry entries, cookies associated with browser application 115, identifiers associated with hardware of user device 110, or other appropriate identifiers, such as used for payment/user/device authentication or identification. In one embodiment, user identifier 130 may be used by a payment service provider to associate user 105 with a particular account maintained by the payment service provider. A communications application 122, with associated interfaces, enables user device 110 to communicate within system 100.

Merchant server 140 may be maintained, for example, by a merchant or seller offering various items, products and/or services through an online site or app. Generally, merchant server 140 may be maintained by anyone or any entity that receives money, which includes charities as well as retailers and restaurants. Merchant server 140 includes a database 145 identifying available products and/or services (e.g., collectively referred to as items) which may be made available for viewing and purchase by user 105. Merchant server 140 also includes a marketplace application 150 which may be configured to serve information over network 160 to browser 115 of user device 110 and/or payment service provider server 170. In one embodiment, user 105 may interact with marketplace application 150 to view various items available for purchase from the merchant.

Merchant server 140 also includes a checkout application 155 which may be configured to facilitate the purchase by user 105 of goods or services identified by marketplace application 150. Checkout application 155 may be configured to accept payment information from or on behalf of user 105 through payment service provider server 170 over network 160. For example, checkout application 155 may receive and process a payment confirmation from payment service provider server 170, as well as transmit transaction information to the payment service provider and receive information from the payment service provider (e.g., a transaction ID). Checkout application 155 may also be configured to accept one or more different funding sources for payment.

The merchant server 140, in one embodiment, may include at least one merchant identifier 160, which may be included as part of the one or more items made available for purchase so that, e.g., particular items are associated with particular merchants. In one implementation, the merchant identifier 160 may include one or more attributes and/or parameters related to the merchant, such as business and banking information. In various embodiments, user 105 may conduct transactions (e.g., searching, selection, monitoring, purchasing, and/or providing payment for items) with each merchant server 140 via the payment service provider server 170 over the network 160.

A merchant website may also communicate (for example, using merchant server 140) with the payment service provider through payment service provider server 170 over network 160. For example, the merchant website may communicate with the payment service provider in the course of various services offered by the payment service provider to merchant website, such as payment intermediary between customers of the merchant website and the merchant website itself. For example, the merchant website may use an application programming interface (API) that allows it to offer sale of goods in which customers are allowed to make payment through the payment service provider, while user 105 may have an account with the payment service provider that allows user 105 to use the payment service provider for making payments to merchants that allow use of authentication, authorization, and payment services of payment service provider as a payment intermediary. The merchant website may also have an account with the payment service provider.

Payment service provider server 170 may be maintained, for example, by an online service provider which may provide payment between user 105 and the operator of merchant server 140. In this regard, payment service provider server 170 includes one or more payment applications 175 which may be configured to interact with user device 110 and merchant server 140 over network 160 to facilitate the purchase of goods or services by user 105 of user device 110 as well as search merchant offerings and prices as discussed above.

Payment service provider server 170 also maintains a plurality of user accounts 180, each of which may include account information 185 associated with individual users. For example, account information 185 may include private financial information of users of devices such as account numbers, passwords, device identifiers, user names, phone numbers, credit card information, bank information, or other financial information which may be used to facilitate online transactions by user 105. Account information 185 may also include information associated with the payment process described herein. Advantageously, payment application 175 may be configured to interact with merchant server 140 on behalf of user 105 during a transaction with checkout application 155 to handle payments.

A transaction processing application 190, which may be part of payment application 175 or separate, may be configured to receive information from a user device and/or merchant server 140 for processing and storage in a payment database 195 as described above. Transaction processing application 190 may include one or more applications to process information from user 105 and/or the merchant for processing a transaction from user device 110 as described herein. As such, transaction processing application 190 may store details of a transaction or from an email and associate the details accordingly for individual users. Payment application 175 may be further configured to determine the existence of and to manage accounts for user 105, as well as create new accounts if necessary, such as the set-up, management, and provide various services as described herein.

Figure 2:
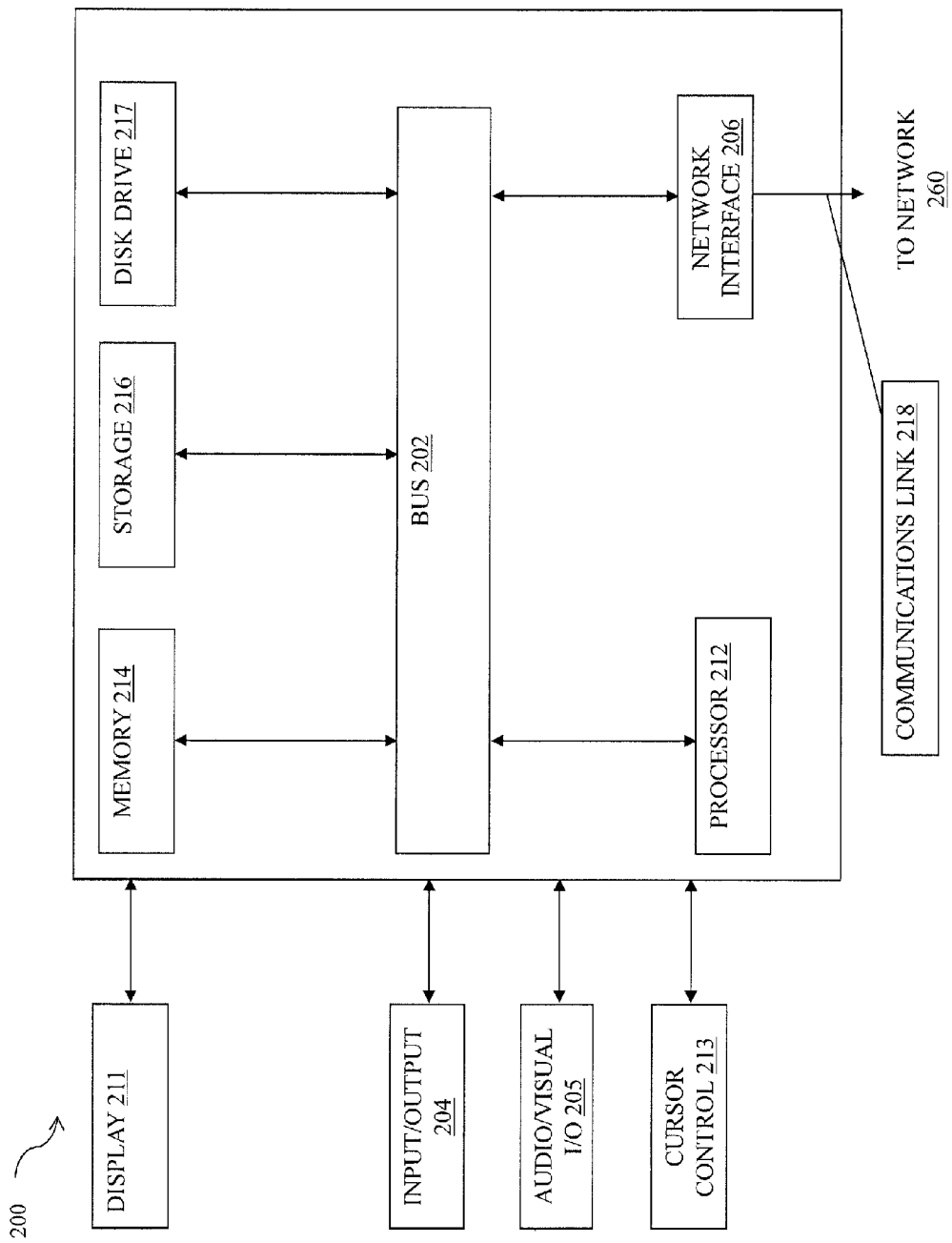
FIG. 2 is a block diagram of a system for implementing a device according to an embodiment of the present disclosure.

FIG. 2 is a block diagram of a computer system 200 suitable for implementing one or more embodiments of the present disclosure. In various implementations, the user device may comprise a personal computing device (e.g., a personal computer, laptop, smart phone, tablet, PDA, Bluetooth device, key FOB, badge, etc.) capable of communicating with the network. The merchant and/or payment service provider may utilize a network computing device (e.g., a network server) capable of communicating with the network. It should be appreciated that each of the devices utilized by users, merchants, and payment service providers may be implemented as computer system 400 in a manner as follows.

Computer system 200 includes a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). One or more optional audio/video (A/V) input/output (I/O) components 405 may also be included to allow a user to use voice and/or video for inputting information by converting audio signals. A/V I/O component 205 may allow the user to hear audio. A transceiver or network interface 206 transmits and receives signals between computer system 200 and other devices, such as another user device, a merchant server, or a payment service provider server via network 260. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217 to store information, such as account information, transaction numbers, machine IDs, and other information described above. Computer system 200 performs specific operations by processor 212 and other components by executing one or more sequences of instructions contained in system memory component 214. Instructions may be performed by one or more processors 212. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Figure 3:
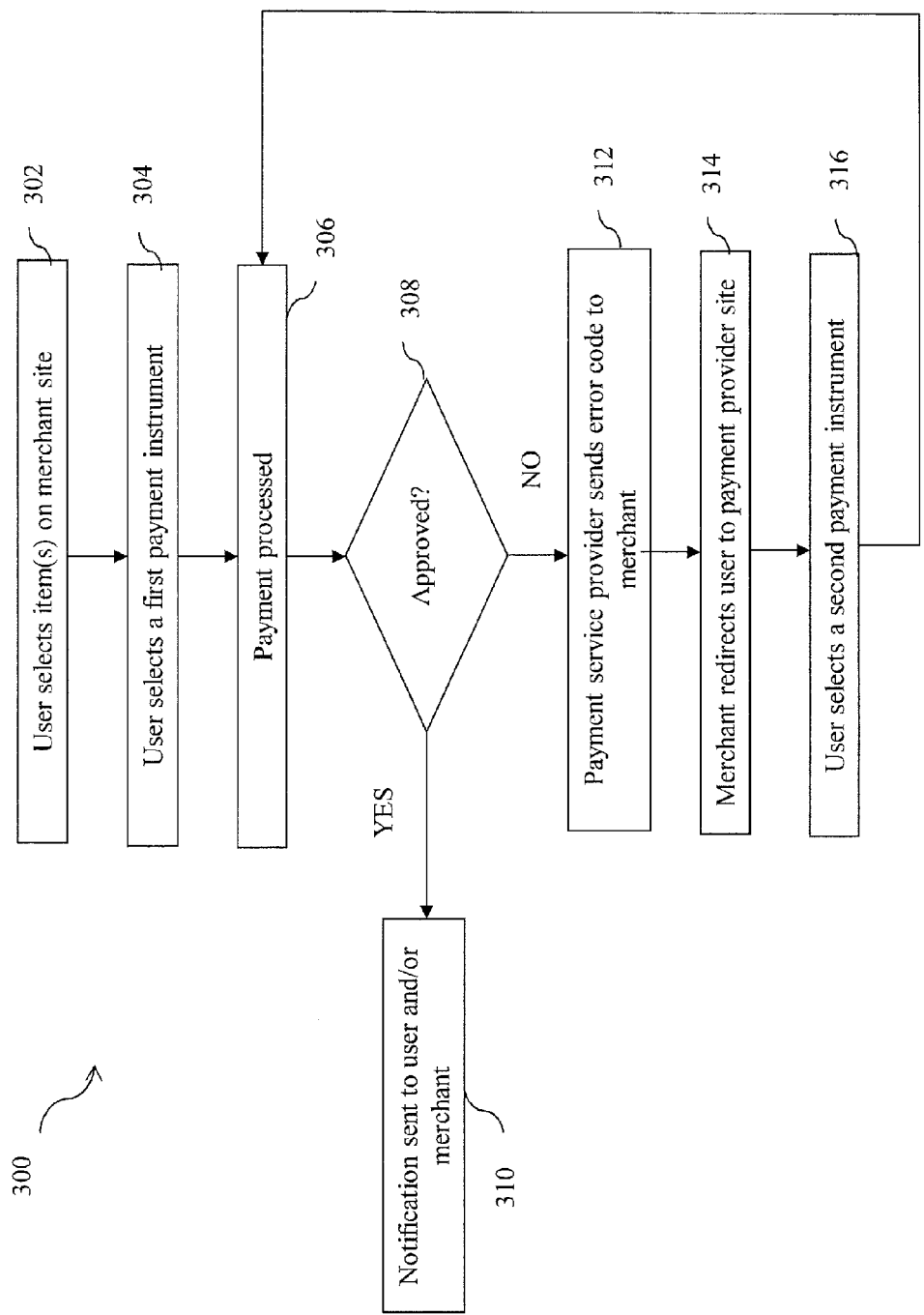
FIG. 3. is a flowchart showing a method for facilitating a purchase according to an embodiment of the present disclosure.

Referring now to FIG. 3, a flowchart 300 for facilitating a purchase is illustrated according to an embodiment of the present disclosure. The user 105 goes through a conventional checkout process. For example, the user 105 may access a merchant site, seller site, marketplace site, or other site or mobile app that enables a user to shop and make a purchase. Access may be through a PC, computing tablet, smart phone, or other computing device. The purchase may be items, physical goods, digital goods, donations, services, etc.

At step 302, the user 105 selects desired items for purchase. Note that items, as used herein, may include one or more of the different purchases listed above. The selected items may be placed in a cart, which the user 105 can review and edit if needed. The user 105 continues by entering information for the purchase, such as shipping address, billing address for a credit card, and funding source information. Such information may be pre-populated if it was saved within the site. In that case, the user 105 would simply need to confirm the information or revise if needed. If the information is not saved, the user 105 may need to manually enter the requested information.

Once the requested information has been entered or provided, the user 105 may confirm the order. Before confirmation, the user 105 may be presented with details of the purchase, such as item description, item prices, total price, shipping costs, tax, etc. If the details are acceptable and correct, the user 105 may select a "Confirm," "Pay," or other button or link to confirm the order.

If the user 105 is paying with a payment service provider, such as PayPal® Inc. of San Jose, the user 105 selects an appropriate button or link on the merchant page. The user 105 is then presented with a login screen, either as a new page or a pop-up screen on the same page, requesting login information, such as a user identifier (e.g., user name, email address) and a password or PIN.

The user 105 enters his or her login information and the payment service provider issues a token to the user 105 and places this token on the user device 120. The token is also passed to the merchant server 140. The token may take the form of cookies for online browsing sessions, or it may involve code stored in memory. The token contains the user login and password information of the user 105, and allows the payment service provider to recognize the user 105 as authorized for as long as user 105 remains on the payment service provider site or until payment is successfully completed. In some embodiments, the token expires quickly, sometimes logging the user 105 out after a period of inactivity, or the token could be deleted due to a critical error signaling the end of the payment. In various embodiments, the token is associated with the transaction between the user 105 and the merchant. Accordingly, the token can be used to identify not only the user 105, but also a specific transaction, and facilitate faster checkout.

At step 304, the user 105 selects on the payment service provider site a desired first payment instrument such as a credit card, debit card, bank account, or account with the payment service provider, out of a list of payment instruments. In another embodiment, a particular payment instrument may be automatically provided by the payment service provider as a default payment means. If it is desired, the user 105 can change the default payment instrument to another payment instrument. Also, the user 105 may be able to add another payment instrument(s), remove a particular payment instrument from the list, or change any information on any registered payment instrument.

After selecting a payment instrument, the user 105 may be shown a page that displays the information of the selected payment instrument and the items for purchase from the merchant's site. The payment service provider may request the user 105's confirmation for the items to be purchased and for the selected payment instrument.

When the user 105 confirms a particular payment instrument on the payment service provider's site and completes the checkout process, the merchant is notified of this and makes a payment request, via the API of the payment service provider, to the entity that issued the payment instrument to the user 105. The user 105 is consequently logged out of the payment service provider site, but remains on the merchant page. In an embodiment, before making such a request, the merchant site may further display a page showing summary of the purchase for the user's reference or for demanding another confirmation.

The standard way for coordinating payments in e-commerce transactions is to charge payment instruments in real time as soon as the relevant details have been received. In one embodiment, the merchant does not charge the payment instrument or make a payment request right away. Instead, the merchant may wait for the order to be ready and shipped before the payment instrument is charged. The delay may be in the order of a few hours (e.g., 1-3 hours) to several days (e.g., a week or two). In this case, after the delay, the merchant sends a transaction ID to the payment service provider, and the merchant then makes the payment request through the API of the payment service provider.

The payment and/or account information is then processed at step 306, such as by a credit card company, a bank, the merchant, a service provider, or a payment service provider. If the payment can be approved at step 308, a notification is sent to the user 105 and/or the merchant that the payment is approved or completed at step 310. A transaction number or identifier may accompany the notification.

For various reasons, the payment request from the merchant can be declined by a processor of the entity that issued the first payment instrument. For example, the payment instrument may have expired or been canceled, insufficient funds, the transaction exceeds a transaction limit, and/or the 3-digit or 4-digit verification code cannot be verified. In these instances, the problem can be corrected by supplying a different card or payment instrument.

In a conventional method, the user 105 merely receives an error message on the merchant's page stating that the transaction was declined. Also at this point, the payment service provider cannot recover the payment transaction because there is no mechanism on the merchant's site to send the user 105 back to the payment service provider's site.

In an embodiment of the present disclosure, when payment is declined by the issuer of the payment instrument, the payment service provider at step 312 sends an error code to the merchant. The error code notifies the merchant that the failed transaction is recoverable if the user 105 chooses a new funding source or payment instrument. The error code may be a preset code between the merchant and payment service provider, and may include letters, numbers, characters or a combination thereof. The error code operates as a request for the merchant to redirect the user 105, who is still logged on to the merchant's site, back to the payment service provider site.

The same code can be passed to the merchant multiple times when the same failure happens after the payment is attempted with a new funding source. When the failure exceeds a certain number of times (e.g., 3-5), the payment service provider can choose to limit the attempts by sending a different error code to indicate that the payment cannot be recovered, and that the merchant does not need to redirect the user 105 to the payment service provider. Typically, the limit is set to 3 by the payment service provider.

At step 314, the merchant redirects the user 105 to the payment service provider site using the token previously received from the payment service provider, and the user 105 is automatically logged back into the payment service provider site. Since the token identifies all information regarding the user 105's login credentials and the failed transaction, the user 105 is automatically logged back onto the payment service provider's site, bypassing the login page, and led to the same page where the user 105 previously selected the payment instrument that was declined.

The token acts as a key that is used to retrieve information about that payment transaction that is stored by the payment service provider. In addition to storing standard information about the payment (e.g., item purchased, merchant, shipping address, billing address, etc.), the payment service provider stores which payment instrument failed, the number of failures, and a list of payment instruments that previously failed to block their use during subsequent attempts.

In one embodiment, the payment service provider may further display on the redirected page various detailed error messages on why the first payment instrument was declined. The error message may have various degrees of specificity as to the cause of failure, depending on different embodiments. For example, the error message may state that "Your transaction was declined because we are unable to verify this credit card through our card validation process," or the error message may state more specifically, "Your transaction was declined because we were unable to verify the billing address."

Also, in one embodiment, the same kind of error message can be transmitted to the merchant for reference, before the merchant redirects the user 105 to the payment service provider's site. This message can be included in the error code or as a separate message or code.

Figure 4:
FIG. 4 is a screenshot of a user interface when an alternative payment instrument is available.

Depending on different embodiments, the user 105 may be redirected to different pages of the payment service provider's site. When the user 105 previously registered alternative payment instrument(s) with the payment service provider, the user 105 may be redirected to a page where he or she can select a different payment instrument out of the list of the alternative payment instrument(s). In one embodiment, the payment service provider may choose a particular payment instrument, according to user prearrangements, and may present it on the page for the user's confirmation. FIG. 4 illustrates an example page. The page includes the reason 402 why the transaction failed, and explains that another payment method was chosen. The new payment method 404 is a different funding method that can be a card or a bank or any valid payment method. As shown, the new payment method 404 is a credit/debit card. In this case, the user 105 may either confirm it or be given an option to change the selection to another payment instrument on the list. The page also includes the user 105's contact information, and a button 408 that confirms payment. The contact information may not be present in various embodiments. In another embodiment, the entire list of the alternative payment instrument(s) may be given to the user 105 via, for example, a drop-down bar menu for the user 105 to select one. In various embodiments, the particular payment instrument that was just declined may be blocked/hidden or shown, but made un-selectable.

Figure 5:
FIG. 5 is a screenshot of a user interface when an alternative payment instrument is not available.

When there is no alternative payment instrument pre-registered with the payment service provider, the user 105 is redirected to a page of the payment service provider where the user 105 can add or register a new payment instrument by entering all the required information. FIG. 5 shows an example page. The page includes the reason 502 why the transaction failed, as well as a message 504 that the user 105 needs to link or debit or credit card to pay for the purchase. The user 105 is prompted to enter a credit card number 506, expiration date 508, and security code 510. In the embodiment illustrated, the billing address 512 is provided, but may be changed. In another embodiment, the user 105 can link a bank or different funding method for the purchase. The user 105 may save the new payment instrument and continue by clicking on the button 514.

Once the user 105 finishes selecting another payment instrument at step 316, the user 105 may be directed to the final review and confirmation page as in the case of the first payment instrument. As before, the page may show all items to be purchased from the merchant as well and total amounts to be charged to the new payment instrument selected. When the user 105 confirms the information, the payment service provider notifies the merchant and directs the user 105 back to the merchant's site.

Concurrently, the merchant makes another request to process the payment for the same purchase, i.e., the same items the user 105 attempted to pay for with the first payment instrument. If the second payment instrument is also declined by its issuer, the same process of redirecting the user 105 to the payment service provider's site described herein may be repeated. If the payment is accepted with the second payment instrument, the user 105 may be directed to a page of the merchant notifying the user of a successful payment transaction.

The embodiments of the present disclosure described herein may be applicable to a situation when the user initiates the payments and remains active in the web flow, such as being logged in on the merchant's site, but are generally not applicable when the user does not initiate the transaction or is offline during the transaction.

Advantageously, the present disclosure describes systems and methods that allow a user to select another payment instrument without requiring the user to login and re-enter previously provided information. The systems and methods remember the transaction state of the user so the user is kept in the same session and the same checkout flow. This allows the user to purchase items quickly and provides the user with a smooth, hassle-free experience.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

What is claimed is:

1. A transaction recovery system comprising:
    a non-transitory memory storing payment information of a user; and
    one or more hardware processors coupled to the non-transitory memory and configured to read instructions from the non-transitory memory to cause the system to perform operations comprising:
        issuing an electronic token to the user, wherein the electronic token contains user login and password information for the user;
        storing the electronic token on a user device associated with the user;
        receiving, from the user on a webpage of a payment service provider site, a selection of a first payment instrument;
        receiving, from a merchant, a request to process payment with the first payment instrument for a purchase the user made on a merchant site;
        receiving, from an entity that issued the first payment instrument, a rejection of the first payment instrument;
        transmitting, to the merchant, a request to redirect the user to the payment service provider site;
        automatically logging in the user to the payment service provider site using the electronic token to bypass a login page of the payment service provider site;
        redirecting the user back to the webpage where the user selected the first payment instrument;
        receiving, from the user on the webpage of the payment service provider site, a selection of a second payment instrument; and
        receiving, from the merchant, a request to process payment with the second payment instrument for the purchase.

2. The transaction recovery system of claim 1, wherein the operations further comprise displaying, to the user on the payment service provider's site, a message regarding why the first payment instrument was rejected.

3. The transaction recovery system of claim 1, wherein the electronic token is associated with the purchase.

4. The transaction recovery system of claim 1, wherein the request to redirect the user is in the form of an error code.

5. The transaction recovery system of claim 4, wherein the operations further comprise transmitting, to the merchant, a second error code after a predetermined number of payment attempts have failed.

6. The transaction recovery system of claim 1, wherein the operations further comprise selecting the second payment instrument from a list of payment instruments pre-registered by the user.

7. The transaction recovery system of claim 1, wherein the second payment instrument is a new payment instrument.

8. A method for recovering a declined transaction, comprising:
- receiving, by one or more hardware processors of a payment service provider, a selection of a first payment instrument from a user on a webpage of a payment service provider site;
- receiving, by the one or more hardware processors, a request to process payment with the first payment instrument for a purchase the user made on a merchant site from a merchant;
- receiving, by the one or more hardware processors, a rejection of the first payment instrument from an entity that issued the first payment instrument;
- transmitting, by the one or more hardware processors, a request to redirect the user to the payment service provider site to the merchant;
- automatically logging in, by the one or more hardware processors, the user to the payment service provider site to bypass a login page of the payment service provider site;
- redirecting, by the one or more hardware processors, the user back to the webpage where the user selected the first payment instrument;
- receiving, by the one or more hardware processors, a selection of a second payment instrument from the user on the webpage of the payment service provider site; and
- receiving, by the one or more hardware processors, a request to process payment with the second payment instrument for the purchase from the merchant.

9. The method of claim 8, further comprising displaying, to the user on the payment service provider site, a message regarding why the first payment instrument was rejected.

10. The method of claim 8, wherein the user is logged in to the payment service provider site using an electronic token associated with the user and the purchase.

11. The method of claim 8, wherein the request to redirect the user is in the form of an error code.

12. The method of claim 11, further comprising transmitting a second error code to the merchant after a predetermined number of payment attempts have failed.

13. The method of claim 8, further comprising selecting the second payment instrument from a list of payment instruments pre-registered by the user.

14. The method of claim 8, wherein the second payment instrument is a new payment instrument.

15. A non-transitory machine-readable medium having stored thereon machine-readable instructions executable to cause a machine to perform operations comprising:
- receiving a selection of a first payment instrument from a user on a webpage of a payment service provider site;
- receiving a request to process payment with the first payment instrument for a purchase the user made on a merchant site from a merchant;
- receiving a rejection of the first payment instrument from an entity that issued the first payment instrument;
- transmitting a request to redirect the user to the payment service provider site to the merchant;
- automatically logging in the user to the payment service provider site to bypass a login page of the payment service provider site;
- redirecting the user back to the webpage where the user selected the first payment instrument;
- receiving a selection of a second payment instrument from the user on the webpage of the payment service provider site; and
- receiving a request to process payment with the second payment instrument for the purchase from the merchant.

16. The non-transitory machine-readable medium of claim 15, wherein the operations further comprise displaying, to the user on the payment service provider site, a message regarding why the first payment instrument was rejected.

17. The non-transitory machine-readable medium of claim 15, wherein the user is logged in to the payment service provider site using an electronic token associated with the user and the purchase.

18. The non-transitory machine-readable medium of claim 15, wherein the request to redirect the user is in the form of an error code.

19. The non-transitory machine-readable medium of claim 18, wherein the operations further comprise transmitting a second error code to the merchant after a predetermined number of payment attempts have failed.

20. The non-transitory machine-readable medium of claim 15, wherein the operations further comprise selecting the second payment instrument from a list of payment instruments pre-registered by the user.

* * * * *